(12) United States Patent
Fan et al.

(10) Patent No.: US 8,236,737 B2
(45) Date of Patent: Aug. 7, 2012

(54) PARTICLES COMPRISING A FLUORINATED SILOXANE AND METHODS OF MAKING AND USING THE SAME

(75) Inventors: Wayne W. Fan, Cottage Grove, MN (US); John D. Skildum, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 369 days.

(21) Appl. No.: 12/517,699

(22) PCT Filed: Dec. 5, 2007

(86) PCT No.: PCT/US2007/086462
§ 371 (c)(1),
(2), (4) Date: Jun. 4, 2009

(87) PCT Pub. No.: WO2008/070704
PCT Pub. Date: Jun. 12, 2008

(65) Prior Publication Data
US 2010/0018706 A1   Jan. 28, 2010

Related U.S. Application Data

(60) Provisional application No. 60/868,996, filed on Dec. 7, 2006.

(51) Int. Cl.
C09K 8/60 (2006.01)
E21B 43/16 (2006.01)
E21B 43/26 (2006.01)

(52) U.S. Cl. ............... 507/205; 166/305.1; 166/308.1; 166/308.2; 507/234; 507/901; 507/924

(58) Field of Classification Search .................. 507/205, 507/234, 901, 924; 166/305.1, 308.1, 308.2
See application file for complete search history.

(56) References Cited

U.S. PATENT DOCUMENTS

| | | | |
|---|---|---|---|
| 2,803,615 A | 8/1957 | Ahlbrecht et al. | |
| 3,423,234 A | 1/1969 | Heine | |
| 3,442,664 A | 5/1969 | Heine | |
| 3,492,394 A | 1/1970 | Heine | |
| 3,646,085 A | 2/1972 | Bartlett | |
| 3,810,874 A | 5/1974 | Mitsch et al. | |
| 3,950,588 A | 4/1976 | McDougal | |
| 3,993,443 A | 11/1976 | Guenthner | |
| 4,085,137 A | 4/1978 | Mitsch et al. | |
| 4,231,428 A | 11/1980 | Needham et al. | |
| 4,564,456 A | 1/1986 | Homan | |
| 4,601,950 A | 7/1986 | Iida et al. | |
| 4,647,413 A | 3/1987 | Savu | |
| 5,194,326 A | 3/1993 | Arthur et al. | |
| 5,209,775 A | 5/1993 | Bank et al. | |
| 5,274,159 A | 12/1993 | Pellerite et al. | |
| 5,306,758 A | 4/1994 | Pellerite | |
| 5,437,894 A | 8/1995 | Ogawa et al. | |
| 5,578,278 A | 11/1996 | Fall et al. | |
| 5,658,962 A | 8/1997 | Moore et al. | |
| 5,702,509 A | 12/1997 | Pellerite et al. | |
| 5,851,674 A | 12/1998 | Pellerite et al. | |
| 5,852,148 A | 12/1998 | Behr et al. | |
| 5,980,992 A | 11/1999 | Kistner et al. | |
| 6,206,102 B1 | 3/2001 | Pusch et al. | |
| 6,277,485 B1 | 8/2001 | Invie et al. | |
| 6,361,870 B1 | 3/2002 | Steffl et al. | |
| 6,579,572 B2 | 6/2003 | Espin et al. | |
| 6,592,659 B1 | 7/2003 | Terrazas et al. | |
| 6,613,860 B1 | 9/2003 | Dams et al. | |
| 6,646,088 B2 | 11/2003 | Fan et al. | |
| 6,649,272 B2 | 11/2003 | Moore et al. | |
| 6,664,354 B2 | 12/2003 | Savu et al. | |
| 6,689,854 B2 | 2/2004 | Fan et al. | |
| 6,716,534 B2 | 4/2004 | Moore et al. | |
| 6,772,838 B2 * | 8/2004 | Dawson et al. | ............ 166/280.1 |
| 6,977,307 B2 | 12/2005 | Dams | |
| 6,991,826 B2 | 1/2006 | Pellerite et al. | |
| 7,041,727 B2 | 5/2006 | Kubicek | |
| 7,135,231 B1 * | 11/2006 | Sinclair et al. | ................ 428/407 |
| 7,166,329 B2 | 1/2007 | Dams | |
| 7,294,731 B1 * | 11/2007 | Flynn et al. | ................... 556/427 |
| 7,321,018 B2 | 1/2008 | Dams et al. | |
| 7,470,741 B2 | 12/2008 | Dams | |
| 7,495,118 B2 | 2/2009 | Dams et al. | |
| 7,585,817 B2 | 9/2009 | Pope et al. | |
| 7,652,115 B2 | 1/2010 | Dams et al. | |
| 2001/0055672 A1 | 12/2001 | Todd | |
| 2003/0083448 A1 | 5/2003 | Fan et al. | |
| 2003/0224165 A1 * | 12/2003 | Anderson et al. | ............ 428/403 |

(Continued)

FOREIGN PATENT DOCUMENTS

| | | |
|---|---|---|
| EP | 0 661 558 | 7/1995 |
| EP | 1 934 287 | 3/2007 |
| GB | 2 218 097 | 11/1989 |
| RU | 2257465 | 4/2005 |
| WO | WO 00/63312 | 10/2000 |
| WO | 02/14443 | 2/2002 |
| WO | WO 2005/037884 | 4/2005 |
| WO | WO 2005/066236 | 7/2005 |
| WO | WO 2005/100007 | 10/2005 |
| WO | WO 2006/077125 A1 | 7/2006 |
| WO | WO 2006/116868 | 11/2006 |
| WO | WO 2007/033489 | 3/2007 |

OTHER PUBLICATIONS

Adibhatla, "Effect of Surfactants on Wettability of Near-wellbore Regions of Gas Reservoirs", Journal of Petroleum Science and Engineering, 2006, vol. 52, pp. 227-236. (XP002519991).
API Conductivity Test RP 61, "Recommended Practices for Evaluating Short Term Proppant Pack Conductivity," Oct. 1989.
PCT Search Report, PCT/US2007/086462, dated Feb. 26, 2008, 4 pages.
EP Extended Search Report, EP07854948.1, dated Jul. 8, 2010, 8 pages.

(Continued)

Primary Examiner — Timothy J. Kugel

(57) ABSTRACT

Particles, including proppants, comprising a fluorinated siloxane. The particles are useful as proppants in fractured a subterranean geological formation comprising hydrocarbons.

23 Claims, No Drawings

U.S. PATENT DOCUMENTS

| | | | |
|---|---|---|---|
| 2004/0142185 | A1 | 7/2004 | Takushima |
| 2005/0019574 | A1* | 1/2005 | McCrary ...................... 428/403 |
| 2005/0136180 | A1 | 6/2005 | Pellerite et al. |
| 2005/0244641 | A1 | 11/2005 | Vincent |
| 2006/0147645 | A1 | 7/2006 | Dams et al. |
| 2007/0029085 | A1 | 2/2007 | Panga et al. |
| 2007/0225176 | A1 | 9/2007 | Pope et al. |
| 2010/0137169 | A1* | 6/2010 | Pope et al. .................... 507/205 |
| 2010/0167964 | A1* | 7/2010 | Pope et al. .................... 507/205 |
| 2010/0276142 | A1* | 11/2010 | Skildum et al. ............ 166/280.2 |

OTHER PUBLICATIONS

Fahes et al., "Wettability Alteration to Intermediate Gas-Wetting in Gas-Condensate Reservoirs at High Temperatures", SPE 96184.

Kumar, "Improving the Gas/Condensate Relative Permeability Using Chemical Treatments", presented at the 2006 SPE Gas Technology Symposium held in Calgary, Aberta, Canada, May 15-17, 2006, SPE 100529.

Kumar et al., "Improving the Gas and Condensate Relative Permeability Using Chemical Treatments", presented at the 2006 SPE Gas Technology Symposium held in Calgary, Alberta, Canada, May 15-17, 2006, SPE 100529.

Li, K. et al., "Experimental Study of Wettability Alteration to Preferential Gas-Wetting in Porous Media and Its Effects", SPE Reservoir Eval. and Eng 3 (2), pp. 139-149.

Noh et al., "Experimental Study of Wettability Alteration for Reservoir Rock", Project 3-Gas Condensate Reservoirs Part 2, Reservoir Engineering Research Institute, Apr. 1-Jun. 30, 2Q.05.

Noh et al., "Effect of Wettability on High-Velocity Coefficient in Two-Phase Gas-Liquid Flow", SPE 102773, 2006 SPE Annual Technical Conference and Exhibition held in San Antonion, TX, Sep. 24-27, 2006.

Tang et al., "Relative Permeability Modification in Gas-Liquid Systems Through Wettability Alteration to Intermediate Gas-Wetting", presented at the 2000 SPE Annual Technical Conference and Exhibition held in Dallas, Texas, Oct. 1-4, 2000, SPE 62934.

\* cited by examiner

PARTICLES COMPRISING A FLUORINATED SILOXANE AND METHODS OF MAKING AND USING THE SAME

CROSS REFERENCE TO RELATED APPLICATIONS

This application is a national stage filing under 35 U.S.C. 371 of PCT/US2007/086462, filed Dec. 5, 2007, which claims priority to U.S. Provisional Application No. 60/868,996, filed Dec. 7, 2006, the disclosure of which is incorporated by reference in its entirety herein.

BACKGROUND

Oil and natural gas can be produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the permeability of the formation holding the gas or oil is insufficient for the desired recovery of oil and gas. In other cases, during operation of the well, the permeability of the formation drops to the extent that further recovery becomes uneconomical. In such cases, it is common to fracture the formation and prop the fracture in an open condition using a proppant material or propping agent. Such fracturing is usually accomplished by hydraulic pressure. The proppant material or propping agent is typically a particulate material, such as sand and (man-made) engineered proppants, such as resin coated sand and high-strength ceramic materials (e.g., sintered bauxite, crystalline ceramic bubbles, and ceramic (e.g., glass) beads), which are carried into the fracture by a fluid.

Further, for example, if relatively light weight, porous crystalline ceramic (e.g., alumina) proppants are used, fluid (e.g., the fracturing fluid) can penetrate into the proppant increasing its density, which can in turn can adversely affect the flow of the proppant into the fractured areas.

There continues to be a need for additional proppant options, preferably, proppants with improved properties. Also, for example, there is a desire, particularly for relatively light weight, porous proppants, to prevent, or at least reduce, penetration of fluids into the proppants.

SUMMARY

In one aspect, the present invention provides particle(s) treated with at least one fluorinated siloxane, the particle being at least 500 micrometers (in some embodiments, at least 600, 700, 800, 900, 1000, 1100, 1200, 1300, 1400, 1500, 1600, or even at least 1700 micrometers; in some embodiments, in a range from 500 micrometers to 1700 micrometers) in size, wherein, wherein the fluorinated siloxane comprises a condensation product of at least one reactive fluorinated silane selected from the group consisting of:

a polymeric fluorinated composition comprising:
at least one divalent unit represented by the formula:

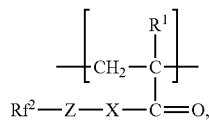

and
at least one of
at least one divalent unit represented by the formula:

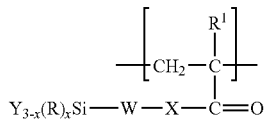

or
a chain-terminating group represented by the formula:

a fluorinated urethane oligomer of at least two repeat units comprising:
at least one end group represented by the formula —O—Z—Rf², and
at least one end group represented by the formula —X¹—W—SiY$_{3-x}$(R)$_x$;
wherein
Rf is a monovalent or multivalent perfluoroalkyl group optionally interrupted by at least one —O—;
Rf² is a monovalent perfluoroalkyl group optionally interrupted by at least one —O—;
each R is independently selected from the group consisting of alkyl having one to six carbon atoms and aryl;
Q is a divalent or trivalent organic linking group;
each Y is independently selected from the group consisting of hydroxyl, alkoxy, acyloxy, and halogen;
each R¹ is independently selected from the group consisting of hydrogen and alkyl having one to four carbon atoms;
each W is independently selected from the group consisting of alkylene, arylalkylene, and arylene, wherein alkylene is optionally interrupted or substituted by at least one heteroatom;
each X is independently selected from the group consisting of —NH—, —O—, and —S—;
X¹ is selected from the group consisting of —N(H)—, —S—, —O—, —O—C(O)—NH—, and —O-alkylene-O—C(O)—NH—;
Z is a divalent organic linking group;
x is 0, 1, or 2;
y is 1 or 2; and
z is 1, 2, 3, or 4.

In some embodiments, the treated particles are included with a plurality of other particles (i.e., a plurality of particles comprising the treated particles having the specified size). In some embodiments, the "other particles" may be or include "treated particles" less than 500 micrometers in size. In some embodiments, these particles collectively have particles in a range from 100 micrometers to 3000 micrometers (i.e., about 140 mesh to about 5 mesh (ANSI)) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), or 300 micrometers to 600 micrometers (i.e., about 50 mesh to about 30 mesh). In some embodiments, the "collective" plurality of particles comprises at least 5, 10, 15, 20, 25, 30, 35, 40, 45, 50, 55, 60, 65, 70, 75, 80, 85, 90, 95, 96, 97, 98, 99, or even at least 100 percent by weight of the treated particles. In some embodiments, the fluorinated siloxane is bonded to the treated particle.

In another aspect, the present invention provides a ceramic (i.e., glass, crystalline ceramic, glass-ceramic, and/or combinations thereof) particle comprising at least one fluorinated siloxane, wherein the ceramic particle has a plurality of pores, and, wherein the fluorinated siloxane comprises a condensation product of at least one reactive fluorinated silane selected from the group consisting of:

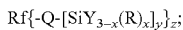

a polymeric fluorinated composition comprising:
at least one divalent unit represented by the formula:

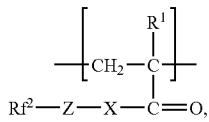

and
at least one of
at least one divalent unit represented by the formula:

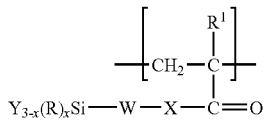

or
a chain-terminating group represented by the formula:

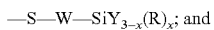

a fluorinated urethane oligomer of at least two repeat units comprising:
at least one end group represented by the formula —O—Z—Rf², and
at least one end group represented by the formula —X¹—W—SiY$_{3-x}$(R)$_x$;
wherein
Rf is a monovalent or multivalent perfluoroalkyl group optionally interrupted by at least one —O—;
Rf² is a monovalent perfluoroalkyl group optionally interrupted by at least one —O—;
each R is independently selected from the group consisting of alkyl having one to six carbon atoms and aryl;
Q is a divalent or trivalent organic linking group;
each Y is independently selected from the group consisting of hydroxyl, alkoxy, acyloxy, and halogen;
each R¹ is independently selected from the group consisting of hydrogen and alkyl having one to four carbon atoms;
each W is independently selected from the group consisting of alkylene, arylalkylene, and arylene, wherein alkylene is optionally interrupted or substituted by at least one heteroatom;
each X is independently selected from the group consisting of —NH—, —O—, and —S—;
X¹ is selected from the group consisting of —N(H)—, —S—, —O—, —O—C(O)—NH—, and —O-alkylene-O—C(O)—NH—;
Z is a divalent organic linking group;
x is 0, 1, or 2;
y is 1 or 2; and
z is 1, 2, 3, or 4.

The pores can be closed or open with respect to each other, or a mixture of opened and closed porosity. In some embodiments, the ceramic particles have a density of at least 2 g/cm³ (in some embodiments, at least 2.5 g/cm³, at least 3 g/cm³; in some embodiments, in a range from 2 g/cm³ to 3 g/cm³). In some embodiments, the treated particles are included with a plurality of other particles (i.e., a plurality of particles comprising the specified treated particles). In some embodiments, the particles are treated with at least one fluorinated siloxane precursor during injection into the fracture, wherein the fluorinated siloxane precursor is converted to the fluorinated siloxane. In some embodiments of the present invention, the fluorinated siloxane is bonded to the particles. In some embodiments, the particles are at least 100 micrometers (in some embodiments, at least 200, 300, 400, 500, 600, 700, 800, 900, 1000, 1100, 1200, 1300, 1400, 1500, 1600, 1700, 1800, 1900, 2000, 2500, or even at least 3000 micrometers; in some embodiments, in a range from 500 micrometers to 1700 micrometers) in size. In some embodiments, the treated particles have particle sizes in a range from 100 micrometers to 3000 micrometers (i.e., about 140 mesh to about 5 mesh) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), 300 micrometers to 600 micrometers (i.e., about 50 mesh to about 30 mesh), 250 micrometers to 425 micrometers (i.e., about 60 mesh to about 40 mesh), 200 micrometers to 425 micrometers (i.e., about 70 mesh to about 40 mesh), or 100 micrometers to 200 micrometers (i.e., about 140 mesh to about 70 mesh). In some embodiments, the treated particles are included with a plurality of other particles (i.e., a plurality of particles comprising the treated particles). In some embodiments, these particles collectively have particles in a range from 100 micrometers to 3000 micrometers (i.e., about 140 mesh to about 5 mesh) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), 300 micrometers to 600 micrometers (i.e., about 50 mesh to about 30 mesh), 250 micrometers to 425 micrometers (i.e., about 60 mesh to about 40 mesh), 200 micrometers to 425 micrometers (i.e., about 70 mesh to about 40 mesh), or 100 micrometers to 200 micrometers (i.e., about 140 mesh to about 70 mesh). In some embodiments, the "collective" plurality of particles comprises at least 5, 10, 15, 20, 25, 30, 35, 40, 45, 50, 55, 60, 65, 70, 75, 80, 85, 90, 95, 96, 97, 98, 99, or even at least 100 percent by weight of the treated particles.

In another aspect, the present invention provides an engineered proppant comprising at least one fluorinated siloxane comprising a condensation product of at least one reactive fluorinated silane selected from the group consisting of:

a polymeric fluorinated composition comprising:
at least one divalent unit represented by the formula:

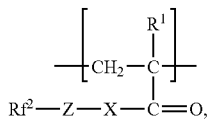

and
at least one of
at least one divalent unit represented by the formula:

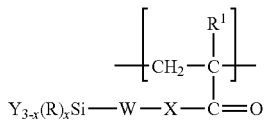

or
a chain-terminating group represented by the formula:

a fluorinated urethane oligomer of at least two repeat units comprising:
at least one end group represented by the formula —O—Z—Rf², and
at least one end group represented by the formula —X¹—W—SiY$_{3-x}$(R)$_x$;
wherein
Rf is a monovalent or multivalent perfluoroalkyl group optionally interrupted by at least one —O—;
Rf² is a monovalent perfluoroalkyl group optionally interrupted by at least one —O—;
each R is independently selected from the group consisting of alkyl having one to six carbon atoms and aryl;
Q is a divalent or trivalent organic linking group;
each Y is independently selected from the group consisting of hydroxyl, alkoxy, acyloxy, and halogen;
each R¹ is independently selected from the group consisting of hydrogen and alkyl having one to four carbon atoms;
each W is independently selected from the group consisting of alkylene, arylalkylene, and arylene, wherein alkylene is optionally interrupted or substituted by at least one heteroatom;
each X is independently selected from the group consisting of —NH—, —O—, and —S—;
X¹ is selected from the group consisting of —N(H)—, —S—, —O—, —O—C(O)—NH—, and —O-alkylene-O—C(O)—NH—;
Z is a divalent organic linking group;
x is 0, 1, or 2;
y is 1 or 2; and
z is 1, 2, 3, or 4.

In some embodiments, the particles are treated with at least one fluorinated siloxane precursor during injection into the fracture, wherein the fluorinated siloxane precursor is converted to the fluorinated siloxane. In some embodiments of the present invention, the fluorinated siloxane is bonded to the particles. In some embodiments, the particles are at least 100 micrometers (in some embodiments, at least 200, 300, 400, 500, 600, 700, 800, 900, 1000, 1100, 1200, 1300, 1400, 1500, 1600, 1700, 1800, 1900, 2000, 2500, or even at least 3000 micrometers; in some embodiments, in a range from 500 micrometers to 1700 micrometers) in size. In some embodiments, the treated particles have particle sizes in a range from 100 micrometers to 3000 micrometers (i.e., about 140 mesh to about 5 mesh) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), 300 micrometers to 600 micrometers (i.e., about 50 mesh to about 30 mesh), 250 micrometers to 425 micrometers (i.e., about 60 mesh to about 40 mesh), 200 micrometers to 425 micrometers (i.e., about 70 mesh to about 40 mesh), or 100 micrometers to 200 micrometers (i.e., about 140 mesh to about 70 mesh). In some embodiments, the treated particles are included with a plurality of other particles (i.e., a plurality of particles comprising the treated particles). In some embodiments, these particles collectively have particles in a range from 100 micrometers to 3000 micrometers (i.e., about 140 mesh to about 5 mesh) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), 300 micrometers to 600 micrometers (i.e., about 50 mesh to about 30 mesh), 250 micrometers to 425 micrometers (i.e., about 60 mesh to about 40 mesh), 200 micrometers to 425 micrometers (i.e., about 70 mesh to about 40 mesh), or 100 micrometers to 200 micrometers (i.e., about 140 mesh to about 70 mesh). In some embodiments, the "collective" plurality of particles comprises at least 5, 10, 15, 20, 25, 30, 35, 40, 45, 50, 55, 60, 65, 70, 75, 80, 85, 90, 95, 96, 97, 98, 99, or even at least 100 percent by weight of the treated particles.

In another aspect, the present invention provides a method of fracturing a subterranean geological formation comprising hydrocarbons, the method comprising:
injecting a hydraulic fluid into a subterranean geological formation comprising hydrocarbons at a rate and pressure sufficient to open a fracture therein; and
injecting into the fracture a fluid containing a plurality of the particles treated with at least one fluorinated siloxane comprising a condensation product of at least one reactive fluorinated silane selected from the group consisting of:

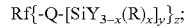

a polymeric fluorinated composition comprising:
at least one divalent unit represented by the formula:

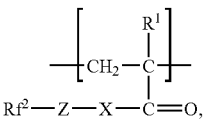

and
at least one of
at least one divalent unit represented by the formula:

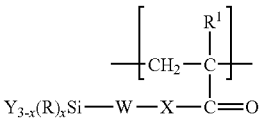

or
a chain-terminating group represented by the formula:

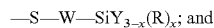

a fluorinated urethane oligomer of at least two repeat units comprising:
at least one end group represented by the formula —O—Z—$Rf^2$, and
at least one end group represented by the formula —$X^1$—W—$SiY_{3-x}(R)_x$;
wherein
Rf is a monovalent or multivalent perfluoroalkyl group optionally interrupted by at least one —O—;
$Rf^2$ is a monovalent perfluoroalkyl group optionally interrupted by at least one —O—;
each R is independently selected from the group consisting of alkyl having one to six carbon atoms and aryl;
Q is a divalent or trivalent organic linking group;
each Y is independently selected from the group consisting of hydroxyl, alkoxy, acyloxy, and halogen;
each $R^1$ is independently selected from the group consisting of hydrogen and alkyl having one to four carbon atoms;
each W is independently selected from the group consisting of alkylene, arylalkylene, and arylene, wherein alkylene is optionally interrupted or substituted by at least one heteroatom;
each X is independently selected from the group consisting of —N(H)—, —O—, and —S—;
$X^1$ is selected from the group consisting of —N—, —S—, —O—, —O—C(O)—NH—, and —O-alkylene-O—C(O)—NH—;
Z is a divalent organic linking group;
x is 0, 1, or 2;
y is 1 or 2; and
z is 1, 2, 3, or 4.

In some embodiments, the fracture has a conductivity improved by the presence of the fluorinated siloxane. The conductivity of a fracture is a measure of the effectiveness of a hydraulically treated fracture or essentially how well the fracture improves the flow of oil or gas from the formation. The conductivity of a fracture can be determined using API Conductivity Test RP 61, entitled "Recommended Practices for Evaluating Short Term Proppant Pack Conductivity" (October, 1989), the disclosure of which is incorporated herein by reference.

In some embodiments, the particles (including engineered proppants) are treated with the fluorinated siloxane prior to injection into the fracture. In some embodiments, the particles are treated with at least one fluorinated siloxane precursor during injection into the fracture, wherein the fluorinated siloxane precursor is converted to the fluorinated siloxane. In some embodiments of the present invention, the fluorinated siloxane is bonded to the particles. In some embodiments, the particles are at least 100 micrometers (in some embodiments, at least 200, 300, 400, 500, 600, 700, 800, 900, 1000, 1100, 1200, 1300, 1400, 1500, 1600, 1700, 1800, 1900, 2000, 2500, or even at least 3000 micrometers; in some embodiments, in a range from 500 micrometers to 1700 micrometers) in size. In some embodiments, the treated particles have particle sizes in a range from 100 micrometers to 3000 micrometers (i.e., about 140 mesh to about 5 mesh) (in some embodiments, in a range from 1000 micrometers to 3000 micrometers, 1000 micrometers to 2000 micrometers, 1000 micrometers to 17000 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), 300 micrometers to 600 micrometers (i.e., about 50 mesh to about 30 mesh), 250 micrometers to 425 micrometers (i.e., about 60 mesh to about 40 mesh), 200 micrometers to 425 micrometers (i.e., about 70 mesh to about 40 mesh), or 100 micrometers to 200 micrometers (i.e., about 140 mesh to about 70 mesh). In some embodiments, the treated particles are included with a plurality of other particles (i.e., a plurality of particles comprising the treated particles). In some embodiments, these particles collectively have particles in a range from 100 micrometers to 3000 micrometers (i.e., about 140 mesh to about 5 mesh) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 to about 20 mesh), 300 micrometers to 600 micrometers (i.e., about 50 mesh to about 30 mesh), 250 micrometers to 425 micrometers (i.e., about 60 mesh to about 40 mesh), 200 micrometers to 425 micrometers (i.e., about 70 mesh to about 40 mesh), or 100 micrometers to 200 micrometers (i.e., about 140 mesh to about 70 mesh). In some embodiments, the "collective" plurality of particles comprises at least 5, 10, 15, 20, 25, 30, 35, 40, 45, 50, 55, 60, 65, 70, 75, 80, 85, 90, 95, 96, 97, 98, 99, or even at least 100 percent by weight of the treated particles.

In some embodiments, the fluorinated siloxane comprises a condensation product of at least one fluorinated urethane oligomer of at least two repeat units comprising:
at least one end group represented by the formula —O—$(CH_2)_n$N($R^4$)S(O)$_2$—$Rf^3$, and at least one end group represented by the formula —NH—$(CH_2)_n$—$SiY_3$;

wherein
$R^4$ is alkyl having one to four carbon atoms
$Rf^3$ is a perfluoroalkyl group having from one to eight carbon atoms;
each Y is independently selected from the group consisting of hydroxyl, alkoxy, acyloxy, and halogen; and
each n is independently an integer from 1 to 4.

Treated proppants described herein are useful, for example, in facilitating the removal of fracturing fluids that have been injected into subterranean formation, including increasing the removal rate of the fracturing fluid. While not wanting to be bound by theory, it is believed this enhanced back-production of the fracturing fluids is due to the fluorinated siloxane altering the wettability of the proppant, thus rendering the proppant hydrophobic, oleophobic, and non-wetted by the fracturing fluids. An additional advantage of enhancing the fluid production from the fracture comprising the proppant treated with the fluorinated siloxane is thought to be the reduction in turbulent flow that should significantly reduce non-Darcy effects. Non-Darcy effects can effectively reduce the conductivity of a fracture by reducing fluid production.

Advantages embodiments of treated particle having a plurality of pores is that the treated particle has at least one of water or oil imbibition up to 95% as compared to a comparable, untreated particle.

DETAILED DESCRIPTION

Exemplary particles for practicing the present invention include those known in the art for use as proppants in fractured subterranean geological formations comprising hydrocarbons, and include engineered proppants (e.g., resin coated sand, sintered bauxite, crystalline ceramic bubbles, ceramic (e.g., glass) beads, and sand graded to desired industry standards). The term "ceramic" as used herein refers to glasses, crystalline ceramics, glass-ceramics, and combinations thereof. Suitable particles can be made by techniques known in the art and/or obtained from commercial sources. Exemplary particles include those made of a material selected from the group consisting of sand, thermoplastic, clay, glass, and alumina (e.g., sintered bauxite). Examples of particles include sand, clay-based particles, thermoplastic particles, and sintered bauxite particles. Sand proppants are available, for example, from Badger Mining Corp., Berlin, Wis.; Borden Chemical, Columbus, Ohio; Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics, and Saint Gobain. Engineered proppants such as glass bead and ceramic microsphere proppants are available, for example, from Diversified Industries, Sidney, British Columbia, Canada; and 3M Company.

In some embodiments, fluorinated siloxanes useful in practicing the present invention comprise a condensation product of a reactive fluorinated silane represented by the formula (I):

$$Rf\{-Q-[SiY_{3-x}(R)_x]_y\}_z \quad I,$$

wherein Rf, Q, Y, $R^1$, x, y, and z are as defined above. Rf is a monovalent or multivalent perfluoroalkyl group optionally interrupted by at least one —O—. Rf can be a linear, branched, and/or cyclic structure, that may be saturated or unsaturated. The term "perfluoroalkyl group" includes groups in which all C—H bonds are replaced by C—F bonds as well as groups in which hydrogen or chlorine atoms are present instead of fluorine atoms provided that not more than one atom of either hydrogen or chlorine is present for every two carbon atoms. In some embodiments, when hydrogen and/or chlorine are present, Rf includes at least one perfluoromethyl group.

In some embodiments, Rf is a monovalent perfluoroalkyl group of formula ($C_nF_{2n+1}$), wherein n is an integer from 1 to 20 (in some embodiments, from 3 to 12 or even from 3 to 8). In some embodiments, Rf is $C_4F_9$.

In some embodiments, Rf is a perfluoropolyether group having two or more in-chain oxygen atoms. In some embodiments, the perfluoropolyether group comprises perfluorinated repeating units selected from the group consisting of —($C_nF_{2n}$)—, —($C_nF_{2n}$O)—, —(CF(Rf$^4$))—, —(CF(Rf$^4$)O)—, —(CF(Rf$^4$)$C_nF_{2n}$O)—, —($C_nF_{2n}$CF(Rf$^4$)O)—, —(CF$_2$CF(Rf$^4$)O)—, and combinations thereof (in some embodiments, —($C_nF_{2n}$O)—, —(CF(Rf$^4$)O)—, —(CF(Rf$^4$)$C_nF_{2n}$O)—, —($C_nF_{2n}$CF(Rf$^4$)O)—, —(CF$_2$CF(Rf$^4$)O)—, and combinations thereof); wherein Rf$^4$ is a perfluoroalkyl group, a perfluoroalkoxy group, or a perfluoroether group, each of which can be linear, branched, or cyclic, and can have 1 to 9 carbon atoms and up to 4 oxygen atoms; and n is an integer from 1 to 12 (in some embodiments, from 1 to 6, from 1 to 4, or even from 1 to 3). The perfluorinated repeating units may be arranged randomly, in blocks, or in alternating sequence.

In some embodiments, Rf is a monovalent (i.e., z is 1) perfluoropolyether group. In some of these embodiments, Rf is terminated with $C_nF_{2n+1}$—, $C_nF_{2n+1}$O—, or $X'C_nF_{2n}$O—, wherein X' is a hydrogen or chlorine atom. In some of these embodiments, the terminal group is $C_nF_{2n+1}$— or $C_nF_{2n+1}$O—, wherein n is an integer from 1 to 6 or from 1 to 3. In some of these embodiments, the approximate average structure of Rf is $C_3F_7O(CF(CF_3)CF_2O)_pCF(CF_3)$— or $CF_3O(C_2F_4O)_pCF_2$—, wherein the average value of p is 3 to 50.

In some embodiments, Rf is a divalent (i.e., z is 2) perfluoropolyether group. In some of these embodiments, Rf is selected from the group consisting of —$CF_2O(CF_2O)_m(C_2F_4O)_pCF_2$—, —$CF(CF_3)$—$(OCF_2CF(CF_3))_pO$—Rf$^5$—$O(CF(CF_3)CF_2O)_pCF(CF_3)$—, —$CF_2O(C_2F_4O)_pCF_2$—, and —$(CF_2)_3O(C_4F_8O)_p(CF_2)_3$—, wherein Rf$^5$ is a divalent, perfluoroalkylene group containing at least one carbon atom and optionally interrupted in chain by O or N; m is 1 to 50; and p is 3 to 40. In some embodiments, Rf$^5$ is ($C_nF_{2n}$), wherein n is 2 to 4. In some embodiments, Rf is selected from the group consisting of —$CF_2O(CF_2O)_m(C_2F_4O)_pCF_2$—, —$CF_2O(C_2F_4O)_pCF_2$—, and —$CF(CF_3)$—$(OCF_2CF(CF_3))_pO$—($C_nF_{2n}$)—$O(CF(CF_3)CF_2O)_pCF(CF_3)$—, wherein n is 2 to 4, and the average value of m+p or p or p+p, respectively, is from about 4 to about 24. In some embodiments, p and m may be non-integral.

The divalent or trivalent organic linking group, Q, can be a linear, branched, or cyclic structure, that may be saturated or unsaturated and optionally contains one or more heteroatoms selected from the group consisting of sulfur, oxygen, and nitrogen, and/or optionally contains one or more functional groups selected from the group consisting of ester, amide, sulfonamide, carbonyl, carbonate, urea, and carbamate. Q includes at least 2 carbon atoms and not more than about 25 carbon atoms (in some embodiments, not more than 24, 23, 22, 21, 20, 19, 18, 17, 16, 15, 14, 13, 12, 11, or even not more than 10 carbon atoms). When two, three, or four Q groups are present, each Q is independently selected. In some embodiments, Q is a linear hydrocarbon containing 1 to about 10 carbon atoms, optionally containing 1 to 4 heteroatoms and/or 1 to 4 functional groups. In some of these embodiments, Q contains one functional group.

Exemplary divalent Q groups include —$SO_2NR^2(CH_2)_kO(O)C$—, —$CON(R^2)(CH_2)_kO(O)C$—, —$(CH_2)_kO(O)C$—, —$C(O)N(R^2)$—$(CH_2)_k$—, —$CH_2CH(O$-alkyl)$CH_2O(O)C$—, —$(CH_2)_kC(O)O(CH_2)_k$—, —$(CH_2)_kSC(O)$—, —$(CH_2)_kO(CH_2)_kO(O)C$—, —$(CH_2)_kS(CH_2)_kO(O)C$—, —$(CH_2)_kSO_2(CH_2)_kO(O)C$—, —$(CH_2)_kS(CH_2)_kOC(O)$—, —$(CH_2)_kSO_2N(R^2)(CH_2)_kO(O)C$—, —$(CH_2)_kSO_2$—, —$SO_2N(R^2)(CH_2)_kO(CH_2)_k$—, —$SO_2N(R^2)(CH_2)_k$—, —$(CH_2)_kO(CH_2)_kC(O)O(CH_2)_k$—, —$(CH_2)_kSO_2N(R^2)(CH_2)_kC(O)O(CH_2)_k$—, —$(CH_2)_kSO_2(CH_2)_kC(O)O(CH_2)_k$—, —$CON(R^2)(CH_2)_kC(O)O(CH_2)_k$—, —$(CH_2)_kS(CH_2)_kC(O)O(CH_2)_k$—, —$CH_2CH(O$-alkyl$)CH_2C(O)O(CH_2)_k$—, —$SO_2N(R^2)(CH_2)_kC(O)O(CH_2)_k$—, —$(CH_2)_kO(CH_2)_k$—, —$CH_2O$—$(CH_2)_k$—, —$OC(O)N(R^2)(CH_2)_k$—, —$(CH_2)_kN(R^2)$—, —$C_kH_{2k}$—$OC(O)NH$—, —$(CH_2)_kN(R^2)C(O)O(CH_2)_k$—, —$(CH_2)_k$—, —$C_kH_{2k}$—, —$C(O)S$—$(CH_2)_k$—, and —$CH_2OC(O)N(R^2)$—$(CH_2)_k$—, wherein $R^2$ is hydrogen, $C_{1-4}$ alkyl, or phenyl; and k is 2 to about 25 (in some embodiments, 2 to 15 or even 2 to 10).

Exemplary trivalent Q groups include

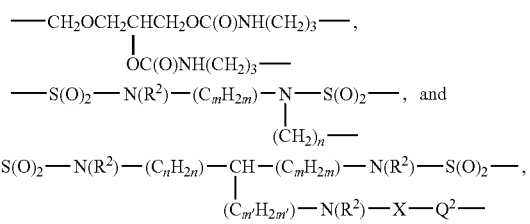

wherein $R^2$ is hydrogen,
$C_{1-4}$ alkyl, or phenyl; each n and m are independently integers from 1 to 20 (in some embodiments, from 1 to 6 or even from 1 to 4); m' is an integer from 1 to 20 (in some embodiments, from 1 to 10 or even from 1 to 3); $Q^2$ is selected from the group consisting of —C(O)NH—$(CH_2)_{n'}$— and —$(CH_2)_{n'}$—, wherein n' is an integer from 0 to 4; and X is selected from the group consisting of —NH—, —O—, and —S—.

Each Y in Formula I is selected from the group consisting of hydroxyl, alkoxy (e.g., of 1 to 4 or even 1 to 2 carbon atoms), aryloxy (e.g., phenoxy), acyloxy (e.g., of 1 to 4 or even 1 to 2 carbon atoms), polyalkyleneoxy, and halogen (e.g., Cl or Br). "Polyalkyleneoxy" refers to —O—(CHR$^5$—CH$_2$O)$_q$—R$^3$ wherein R$^3$ is C$_{1-4}$ alkyl, R$^5$ is hydrogen or methyl, with at least 70% of R$^5$ being hydrogen, and q is 1 to 40, or even 2 to 10. In some embodiments, each Y is independently a hydrolyzable group selected from the group consisting of alkoxy (e.g., of 1 to 4 or even 1 to 2 carbon atoms), aryloxy (e.g., phenoxy), and halogen (e.g., Cl or Br). These hydrolysable groups are capable of hydrolyzing, for example, in the presence of water, optionally under acidic or basic conditions, producing groups capable of undergoing a condensation reaction, for example silanol groups. In some embodiments, R is alkyl of one to six carbon atoms (e.g., methyl, ethyl, propyl, isopropyl, butyl, isobutyl). In some embodiments, R is aryl (e.g., phenyl). In some embodiments, x is 0. In some embodiments, x is 1.

Some reactive fluorinated silanes of formula I are commercially available, for example, as a fluorinated disilane (available, for example, from 3M Company under the trade designation "3M EASY CLEAN COATING ECC-1000"); a fluorinated silane (available, for example, from Daikin Industries, Inc., New York, N.Y. under the trade designation "OPTOOL DSX"); tridecafluorooctyl functional silanes (available, for example, from United Chemical Technologies, Inc., Bristol, Pa. under the trade designation "PETRARCH" (e.g., grades "T2492" and "T2494"); and a 10% by weight fluorinated disilane solution (available, for example, from 3M Company under the trade designation "3M EASY CLEAN COATING ECC-4000").

The compounds of formula I described above can be synthesized using conventional synthetic methods. For example, when Rf is a perfluoropolyether group, perfluoropolyether esters or functional derivatives thereof can be combined with a functionalized alkoxysilane, such as a 3-aminopropylalkoxysilane, according to the method described in U.S. Pat. No. 3,810,874 (Mitsch et al.), the disclosure of which is incorporated herein by reference. It will be understood that functional groups other than esters may be used with equal facility to incorporate silane groups into a perfluoropolyether. Some perfluoropolyether diesters are commercially available (e.g., CH$_3$OC(O)CF$_2$(OCF$_2$CF$_2$)$_{9-10}$(OCF$_2$)$_{9-10}$CF$_2$C(O)OCH$_3$, a perfluoropolyether diester available, for example, from Solvay Solexis, Houston, Tex., under the trade designation "FOMBLIN ZDEAL"). Other perfluoropolyether diesters may be prepared, for example, through direct fluorination of a hydrocarbon polyether diester by methods known in the art (see, e.g., U.S. Pat. Nos. 5,578,278 (Fall et al.) and 5,658,962 (Moore et al.), the disclosures of which are incorporated herein by reference). Perfluoropolyether diesters (and perfluoropolyether monoesters) can also be prepared, for example, by oligomerization of hexafluoropropylene oxide (HFPO) and functionalization of the resulting perfluoropolyether carbonyl fluoride according to the methods described in U.S. Pat. No. 4,647,413 (Savu), the disclosure of which is incorporated herein by reference. An exemplary fluorinated silane of formula I wherein Rf is a divalent perfluoropolyether group is (CH$_3$O)$_3$Si(CH$_2$)$_3$NHCOCF$_2$(OCF$_2$CF$_2$)$_{9-10}$(OCF$_2$)$_{9-10}$CF$_2$CONH(CH$_2$)$_3$Si(OCH$_3$)$_3$.

The above-described polyfluoropolyether silanes typically include a distribution of oligomers and/or polymers, and above structures are approximate average structures where the approximate average is over this distribution. These distributions may also contain perfluoropolyethers with no silane groups or more than two silane groups. Typically, distributions containing less than about 10% by weight of compounds without silane groups can be used.

Methods of making fluorinated silanes of the formula I, wherein Rf is a monovalent perfluoroalkyl group, are known in the art (e.g., by alkylation of fluorinated alcohols or sulfonamides with chloroalkyltrialkoxysilanes, or alkylation with allyl chloride followed by hydrosilation with HSiCl$_3$) (see, e.g., U.S. Pat. No. 5,274,159 (Pellerite et al.), the disclosure of which is incorporated herein by reference), Fluorinated silanes represented by the formulas

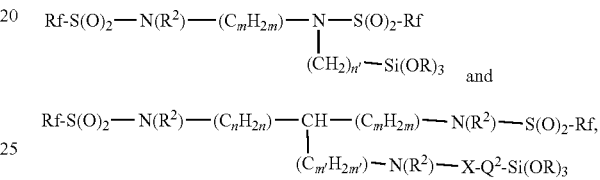

wherein each Rf is independently C$_p$F$_{2p+1}$, wherein p is 1 to 8 and R$^2$, R, m, n, m', n'X, and Q$^2$ are as defined above, can be prepared, for example, by similar methods (e.g., by alkylation of Rf—S(O)$_2$—N(R$^2$)—(C$_{n+m}$H$_{2(n+m)}$)—NH(S(O)$_2$—Rf or Rf—S(O)$_2$—N(R$^2$)—(C$_n$H$_{2n}$)—CH(OH)—(C$_m$H$_{2m}$)—N(R$^2$)—S(O)$_2$—Rf), respectively, with chloroalkyltrialkoxysilanes) or by reaction of Rf—S(O)$_2$—N(R$^2$)—(C$_n$H$_{2n}$)—CH(OH)—(C$_m$H$_{2m}$)—N(R$^2$)—S(O)$_2$—Rf with isocyanatoalkyltrialkoxysilanes as described in U.S. Pat. App. Pub. No. 2006/0147645 (Dams et al.), the disclosure of which is incorporated herein by reference.

Perfluoroalkyl silanes of formula I, wherein Rf is a monovalent perfluoroalkyl group, include, for example, any one or any combination of the following: C$_3$F$_7$CH$_2$OCH$_2$CH$_2$CH$_2$Si(OCH$_3$)$_3$; C$_7$F$_{15}$CH$_2$OCH$_2$CH$_2$CH$_2$Si(OCH$_3$)$_3$; C$_7$F$_{15}$CH$_2$OCH$_2$CH$_2$CH$_2$Si(OCH$_2$CH$_3$)$_3$; C$_7$F$_{15}$CH$_2$OCH$_2$CH$_2$CH$_2$Si(CH$_3$)(OCH$_3$)$_2$; C$_7$F$_{15}$CH$_2$OCH$_2$CH$_2$CH$_2$SiCl$_3$; C$_7$F$_{15}$CH$_2$OCH$_2$CH$_2$CH$_2$Si(CH$_3$)Cl$_2$; C$_7$F$_{15}$CH$_2$OCH$_2$CH$_2$CH$_2$SiCl(OCH$_3$)$_2$; C$_7$F$_{15}$CH$_2$OCH$_2$CH$_2$CH$_2$SiCl$_2$(OC$_2$H$_5$); C$_7$F$_{15}$C(O)NHCH$_2$CH$_2$CH$_2$Si(OCH$_3$)$_3$; CF$_3$(CF$_2$CF(CF$_3$))$_3$CF$_2$C(O)NHCH$_2$CH$_2$CH$_2$Si(OCH$_2$CH$_3$)$_3$; C$_8$F$_{17}$SO$_2$N(CH$_2$CH$_3$)CH$_2$CH$_2$CH$_2$Si(OCH$_3$)$_3$; C$_8$F$_{17}$SO$_2$N(CH$_2$CH$_3$)CH$_2$CH$_2$CH$_2$Si(OCH$_2$CH$_3$)$_3$; C$_4$F$_9$SO$_2$N(CH$_3$)CH$_2$CH$_2$CH$_2$Si(OCH$_3$)$_3$; C$_4$F$_9$SO$_2$N(CH$_3$)CH$_2$CH$_2$CH$_2$Si(OCH$_2$CH$_3$)$_3$; C$_8$F$_{17}$CH$_2$CH$_2$Si(OCH$_3$)$_3$; C$_6$F$_{13}$CH$_2$CH$_2$Si(OCH$_2$CH$_3$)$_3$; C$_6$F$_{13}$CH$_2$CH$_2$Si(Cl)$_3$; C$_8$F$_{17}$CH$_2$CH$_2$Si(OCH$_2$CH$_3$)$_3$; C$_8$F$_{17}$SO$_2$N(CH$_2$CH$_3$)CH$_2$CH$_2$CH$_2$SiCl$_3$; C$_8$F$_{17}$SO$_2$N(CH$_3$)CH$_2$CH$_2$CH$_2$Si(CH$_3$)Cl$_2$; C$_8$F$_{17}$CH$_2$OCH$_2$CH$_2$CH$_2$Si(OAc)$_3$; [C$_4$F$_9$S(O)$_2$N(CH$_3$)CH$_2$]$_2$CHOCH$_2$CH$_2$CH$_2$Si(OCH$_3$)$_3$; [C$_4$F$_9$S(O)$_2$N(CH$_3$)CH$_2$]$_2$CHOC(O)NHCH$_2$CH$_2$CH$_2$Si(OCH$_3$)$_3$, and C$_4$F$_9$S(O)$_2$N(CH$_3$)CH$_2$CH$_2$CH$_2$N(S(O)$_2$C$_4$F$_9$)CH$_2$CH$_2$CH$_2$Si(OCH$_3$)$_3$. Suitable fluorinated silanes of formula I include a mixture of isomers (e.g., a mixture of compounds containing linear and branched perfluoroalkyl groups).

In some embodiments, fluorinated siloxanes useful in practicing the present invention comprise a condensation product of a polymeric fluorinated composition comprising:

at least one divalent unit represented by the formula (II):

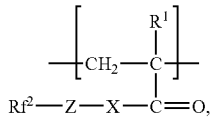

and
at least one of
at least one divalent unit represented by the formula (III):

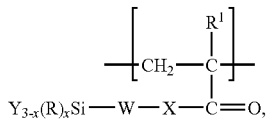

or
a chain-terminating group represented by the formula (IV):

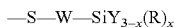        IV, wherein, $Rf^2$, $R^1$, R, W, X, Y, Z, and x are as defined above.

The term "polymeric" refers to both oligomers and polymers. In some embodiments, the number of units represented by formula II is in a range from 1 to 100 (in some embodiments from 1 to 20). In some embodiments, the units represented by formula II are present in a range from 40% by weight to 80% by weight (or even from 50% to 75% by weight) based on the total weight of the polymeric fluorinated composition. In some embodiments, the number of units represented by formula III is in a range from 0 to 100 (or even from 0 to 20). In some embodiments, the units represented by formula III are present in a range from 1% to 20% by weight (or even 2% to 15% by weight) based on the total weight of the polymeric fluorinated composition. In some embodiments, the polymeric fluorinated composition contains at least 5 mole % (based on total moles of monomers) of Y groups. In some embodiments, the polymeric fluorinated composition has a number average molecular weight in a range from 400 to 100000, from 3500 to 100000, or even from 10000 to 75000 grams per mole or in a range from 600 to 20000, or even from 1000 to 10000 grams per mole. It will be appreciated by one skilled in the art that the polymeric fluorinated compositions useful in the present invention exist as a mixture of compounds.

A divalent unit of formula II is introduced into a polymeric fluorinated composition by polymerizing a monomer of the formula (IIa):

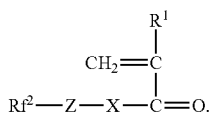

Fluorochemical monomers of formula IIa and methods for the preparation thereof are known in the art (see, e.g., U.S. Pat. No. 2,803,615 (Ahlbrecht et al.), the disclosure of which is incorporated herein by reference). Examples of such compounds include, for example, acrylates or methacrylates derived from fluorochemical telomer alcohols, acrylates or methacrylates derived from fluorochemical carboxylic acids, perfluoroalkyl acrylates or methacrylates as disclosed in U.S. Pat. No. 5,852,148 (Behr et al.), the disclosure of which is incorporated herein by reference, perfluoropolyether acrylates or methacrylates as described in U.S. Pat. No. 4,085,137 (Mitsch et al.), the disclosure of which is incorporated herein by reference, and fluorinated acrylamides, methacrylamides, thioacrylates, and meththioacrylates as described in U.S. Pat. No. 6,689,854 (Fan et al.), the disclosure of which is incorporated herein by reference.

In some embodiments of formulas II and IIa, $Rf^2$ is a monovalent perfluoroalkyl group described above for Rf in embodiments of a compound of formula I.

The divalent organic linking group, Z, can be a linear, branched, or cyclic structure, that may be saturated or unsaturated and optionally contains one or more heteroatoms selected from the group consisting of sulfur, oxygen, and nitrogen, and/or optionally contains one or more functional groups selected from the group consisting of ester, amide, sulfonamide, carbonyl, carbonate, ureylene, and carbamate. Z includes at least 1 carbon atom and not more than about 25 carbon atoms (in some embodiments, not more than 24, 23, 22, 21, 20, 19, 18, 17, 16, 15, 14, 13, 12, 11, or even not more than 10 carbon atoms). In some embodiments of formulas II and IIa, Z is a divalent organic linking group as described above for divalent Q groups. In some embodiments of formulas II and IIa, Z is $-C_yH_{2y}-$, $-CON(R^1)C_yH_{2y}-$, $-SO_2N(R^1)C_yH_{2y}-$, or $-C_yH_{2y}SO_2N(R^1)C_yH_{2y}$, wherein $R^1$ is hydrogen, or alkyl of one to four carbon atoms, and y is independently an integer from 1 to 6 (in some embodiments from 2 to 4). In some embodiments, $R^1$ is hydrogen. In some embodiments, $R^1$ is alkyl of one to four carbon atoms.

Examples of Fluorinated Monomers of Formula IIa include: $C_4F_9SO_2N(CH_3)C_2H_4OC(O)CH=CH_2$; $C_5F_{11}SO_2N(C_2H_5)C_2H_4OC(O)CH=CH_2$; $C_6F_{13}SO_2N(C_2H_5)C_2H_4OC(O)C(CH_3)=CH_2$; $C_3F_7SO_2N(C_4H_9)C_2H_4OC(O)CH=CH_2$; $C_4F_9CH_2CH_2OC(O)CH=CH_2$; $C_5F_{11}CH_2OC(O)CH=CH_2$; $C_6F_{13}CH_2CH_2OC(O)CH=CH_2$; $CF_3(CF_2)_2CH_2OC(O)CH=CH_2$, $CF_3(CF_2)_2CH_2OC(O)C(CH_3)=CH_2$, $CF_3(CF_2)_3CH_2OC(O)C(CH_3)=CH_2$, $CF_3(CF_2)_3CH_2OC(O)CH=CH_2$, $CF_3(CF_2)_3S(O)_2N(R^a)-(CH_2)_2-OC(O)CH=CH_2$, $CF_3(CF_2)_3S(O)_2N(R^a)-(CH_2)_2-OC(O)C(CH_3)=CH_2$, $CF_3CF_2(CF_2CF_2)_{2-8}(CH_2)_2OC(O)CH=CH_2$, $CF_3(CF_2)_7S(O)_2N(R^a)-(CH_2)_2-OC(O)CH=CH_2$, $CF_3(CF_2)_7S(O)_2N(R^a)-(CH_2)_2-OC(O)C(CH_3)=CH_2$, $CF_3(CF_2)_7CH_2CH_2S(O)_2N(CH_3)-(CH_2)_2-OC(O)C(CH_3)=CH_2$, $CF_3O(CF_2CF_2)_uCH_2OC(O)CH=CH_2$, $CF_3O(CF_2CF_2)_uCH_2OC(O)C(CH_3)=CH_2$, $C_3F_7O(CF(CF_3)CF_2O)_uCF(CF_3)CH_2OC(O)CH=CH_2$, and $C_3F_7O(CF(CF_3)CF_2O)_uCF(CF_3)CH_2OC(O)C(CH_3)=CH_2$; wherein $R^a$ represents methyl, ethyl or n-butyl, and u is about 1 to 50.

Polymeric fluorinated compositions according to the present invention may have a divalent unit represented by formula III. A divalent unit of formula III is introduced into a polymeric fluorinated composition by copolymerizing a monomer of formula IIa with a monomer of the formula (IIIa):

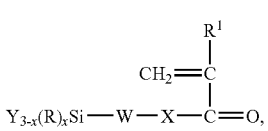

wherein $R^1$, R, W, X, Y, and x are as defined above. In some embodiments of formula IIIa, the groups $R^1$, R, Y, and x are those described above for embodiments of a compound of formula I. In some embodiments, W is alkylene of one to four carbon atoms. Some monomers of formula IIIa are commercially available (e.g., $CH_2=C(CH_3)C(O)OCH_2CH_2CH_2Si(OCH_3)_3$ (available, for example, from Union Carbide, New York, N.Y., under the trade designation "A-174")); others can be made by conventional synthetic methods.

Polymeric fluorinated compositions according to the present invention may optionally include other interpolymerized divalent units, which may contain hydrophobic, hydrophilic, or water-solubilizing groups. Useful monomers (including water-solubilizing monomers) that can be combined with those of formulas IIa and IIIa include non-fluorinated monomers described in U.S. Pat. Nos. 6,977,307 (Dams) and 6,689,854 (Fan et. al.), the disclosures of which are incorporated herein by reference.

Polymeric fluorinated compositions useful in practicing the present invention may have a chain-terminating group represented by formula IV. A chain-terminating group of formula IV may be incorporated into a polymeric fluorinated composition, for example, by polymerizing monomers of formula IIa, optionally IIIa, and optionally at least one non-fluorinated monomer in the presence of a chain-transfer agent of the formula (IVa):

$$HS-W-SiY_{3-x}(R)_x \qquad \text{IVa,}$$

wherein R, W, Y, and x are as defined above. In some embodiments of formula IIIa, the groups R, Y, and x are those described above for embodiments of a compound of formula I. In some embodiments, W is alkylene of one to four carbon atoms. Some monomers of formula IVa are commercially available (e.g., 3-mercaptopropyltrimethoxysilane (available, for example, from Huls America, Inc., Somerset, N.J., under the trade designation "DYNASYLAN")); others can be made by conventional synthetic methods. A chain-terminating group of formula IV can also be incorporated into a polymeric fluorinated composition by polymerizing monomers of formula IIa, optionally IIIa, and optionally at least one non-fluorinated monomer in the presence of a hydroxyl-functional chain-transfer agent (e.g., 2-mercaptoethanol, 3-mercapto-2-butanol, 3-mercapto-2-propanol, 3-mercapto-1-propanol, 3-mercapto-1,2-propanediol) and subsequent reaction of the hydroxyl functional group with, for example, a chloroalkyltrialkoxysilane. In a polymerization reaction to make a polymeric fluorinated composition, a single chain transfer agent or a mixture of different chain transfer agents may be used to control the number of polymerized monomer units in the polymer and to obtain the desired molecular weight of the polymeric fluorochemical silane.

The polymeric fluorinated oligomeric composition can conveniently be prepared through a free radical polymerization of a fluorinated monomer with optionally a non-fluorinated monomer (e.g., a water-solubilizing monomer) and at least one of a monomer containing a silyl group or a chain transfer agent containing a silyl group using methods known in the art. See, for example, the methods described in U.S. Pat. Nos. 6,977,307 (Dams) and 6,689,854 (Fan et. al.), the disclosures of which are incorporated herein by reference.

In some embodiments, fluorinated siloxanes useful in practicing the present invention comprise a condensation product of at least one fluorinated urethane oligomer of at least two repeat units (e.g., from 2 to 20 repeating units) comprising at least one end group represented by the formula —O—Z—Rf², and at least one end group represented by the formula —X¹—W—SiY$_{3-x}$(R)$_x$. In some embodiments, the fluorinated urethane oligomer of at least two repeat units comprises at least one end group represented by the formula —O—(CH$_2$)$_n$N(R⁴)S(O)$_2$—Rf³, and at least one end group represented by the formula —NH—(CH$_2$)$_n$—SiY$_3$, wherein Z, Rf², R⁴, Rf³, Y, and x are as defined above, and n is an integer from 1 to 4.

The term "urethane oligomer" refers to oligomers containing at least one of urethane or urea functional groups. In some embodiments, the at least one fluorinated urethane oligomer of at least two repeat units comprises the reaction product of (a) at least one polyfunctional isocyanate compound; (b) at least one polyol; (c) at least one fluorochemical monoalcohol; (d) at least one silane; and optionally (e) at least one water-solubilizing compound comprising at least one water-solubilizing group and at least one isocyanate-reactive hydrogen containing group. In some embodiments, at least one polyamine may also be used.

Fluorine urethane oligomers useful in the present invention may be prepared, for example, by reaction of at least one polyfunctional isocyanate with at least one polyol and reaction of the resulting oligomer with at least one fluorinated monoalcohol and at least one silane. Exemplary reaction conditions, polyfunctional isocyanates, polyols, fluorochemical monoalcohols, silanes, and water-solubilizing compounds are described in U.S. Pat. No. 6,646,088 (Fan et al.), the disclosure of which is incorporated herein by reference.

In some embodiments of formula —O—Z—Rf², Rf² is a monovalent perfluoroalkyl group described above for Rf in embodiments of a compound of formula I.

The divalent organic linking group, Z, in formula —O—Z—Rf², can be a linear, branched, or cyclic structure, that may be saturated or unsaturated and optionally contains one or more heteroatoms selected from the group consisting of sulfur, oxygen, and nitrogen, and/or optionally contains one or more functional groups selected from the group consisting of ester, amide, sulfonamide, carbonyl, carbonate, ureylene, and carbamate. Z includes at least 1 carbon atom and not more than about 25 carbon atoms (in some embodiments, not more than 24, 23, 22, 21, 20, 19, 18, 17, 16, 15, 14, 13, 12, 11, or even not more than 10 carbon atoms). In some embodiments of formulas II and IIa, Z is a divalent organic linking group as described above for divalent Q groups. In some embodiments of formulas II and IIa, Z is
 —C$_y$H$_{2y}$—, —CON(R¹)C$_y$H$_{2y}$—, —SO$_2$N(R¹)C$_y$H$_{2y}$—, or —C$_y$H$_{2y}$SO$_2$N(R¹)C$_y$H$_{2y}$—,
wherein R¹ is hydrogen or alkyl of one to four carbon atoms, and y is independently an integer from 1 to 6 (in some embodiments from 2 to 4). In some embodiments, Rf is a perfluoroalkyl group having from 2 to 5 (e.g., 4) carbon atoms. An end-group of the formula —O—Z—Rf² ((in some embodiments, O—(CH$_2$)$_n$N(R⁴)S(O)$_2$—Rf³) can be incorporated into a fluorinated urethane oligomer by carrying out the condensation polymerization reaction (e.g., as described above) in the presence of a fluorinated monoalcohol of formula HO—Z—Rf².

Useful fluorinated monoalcohols include, for example, 2-(N-methylperfluorobutanesulfonamido)ethanol; 2-(N-ethylperfluorobutanesulfonamido)ethanol; 2-(N-methylperfluorobutanesulfonamido)propanol; N-methyl-N-(4-hydroxybutyl)perfluorohexanesulfonamide; 1,1,2,2-tetrahydroperfluorooctanol; 1,1-dihydroperfluorooctanol; $C_6F_{13}CF(CF_3)CO_2C_2H_4CH(CH_3)OH$; n-$C_6F_{13}CF(CF_3)CON(H)CH_2CH_2OH$; $C_4F_9OC_2F_4OCF_2CH_2OCH_2CH_2OH$; $C_3F_7CON(H)CH_2CH_2OH$; 1,1,2,3,3-hexahydroperfluorodecanol; $C_3F_7O(CF(CF_3)CF_2O)_{1-36}CF(CF_3)CH_2OH$; $CF_3O(CF_2CF_2O)_{1-36}CF_2CH_2OH$; and mixtures thereof. In some embodiments, the fluorinated monoalcohol is represented by the formula HO—$(C_nH_{2n})N(R^4)S(O)_2$—$Rf^3$.

An end-group of the formula —$X^1$—W—$SiY_{3-x}(R)_x$ can be incorporated into a fluorinated urethane oligomer by carrying out the polymerization reaction (e.g., as described above) in the presence of a silane of formula $HX^1$—W—$SiY_{3-x}(R)_x$ (in some embodiments, $H_2N$—$(CH_2)_n$—$SiY_3$). Useful aminosilanes include, for example, $H_2NCH_2$ $CH_2CH_2Si(OC_2H_5)_3$; $H_2NCH_2CH_2CH_2Si(OCH_3)_3$; $H_2N$ $CH_2CH_2CH_2Si(O$—$N$=$C(CH_3)(C_2H_5))_3$; $HSCH_2CH_2CH_2$ $Si(OCH_3)_3$; $HO(C_2H_4O)_3C_2H_4N(CH_3)(CH_2)_3Si(OC_4H_9)_3$; $H_2NCH_2C_6H_4CH_2CH_2Si(OCH_3)_3$; $HSCH_2CH_2CH_2Si(OC$ $OCH_3)_3$; $N(CH_3)CH_2CH_2Si(OCH_3)_3$; $HSCH_2CH_2CH_2Si$ $CH_3(OCH_3)_2$; $(H_3CO)_3SiCH_2CH_2CH_2NHCH_2CH_2CH_2Si$ $(OCH_3)_3$; $HN(CH_3)C_3H_6Si(OCH_3)_3$; $CH_3CH_2OOCCH_2CH$ $(COOCH_2CH_3)HNC_3H_6Si(OCH_2CH_3)_3$; $C_6H_5NHC_3H_6Si$ $(OCH_3)_3$; $H_2NC_3H_6SiCH_3(OCH_2CH_3)_2$; $HOCH(CH_3)CH_2$ $OCONHC_3H_6Si(OCH_2CH_3)_3$; $(HOCH_2CH_2)_2NCH_2CH_2C$ $H_2Si(OCH_2CH_3)_3$; and mixtures thereof.

Some fluorinated urethane oligomers useful in the present invention are commercially available (e.g., a 20% by weight aqueous fluoropolymer solution available from 3M Company under the trade designation "3M STAIN RESISTANT ADDITIVE SRC-220" and a 30% solution of fluorinated urethane silane available from 3M Company under the trade designation "PM-490").

In some embodiments, the fluorinated siloxane comprises a condensation product of at least one reactive fluorinated silane, as described above, and a compound of the formula (V):

$$(R^6)_qM(Y^1)_{p-q} \qquad\qquad V,$$

wherein M represents an element of valency p+q selected from the group consisting of Si, Ti, Zr, B, Al, Ge, V, Pb, Sn and Zn (in some embodiments selected from the group consisting of Ti, Zr, Si and Al); $R^6$ represents a non-hydrolysable group (e.g., an alkyl group of 1 to 20 carbon atoms which may be straight chained or branched and may include cyclic hydrocarbon structures, a $C_6$-$C_{30}$ aryl group, optionally substituted by one or more substituents selected from halogens and $C_1$-$C_4$ alkyl groups, or a $C_7$-$C_{30}$ arylalkyl group); p is 3 or 4 depending on the valence of M; q is 0, 1 or 2; and $Y^1$ represents a hydrolysable group (e.g., alkoxy, acyloxy, and halogen). Compounds of formula V and formulations containing compounds of formula V, fluorinated silanes, and optionally other crosslinking agents are described, for example, in U.S. Pat. No. 6,716,534 (Moore et al.), the disclosure of which is incorporated herein by reference.

Representative examples of compounds of formula V include tetramethoxysilane, tetraethoxysilane, methyl triethoxysilane, dimethyldiethoxysilane, octadecyltriethoxysilane, methyl trichlorosilane, tetra-methyl orthotitanate, tetra ethyl orthotitanate, tetra-iso-propyl orthotitanate, tetra-n-propyl orthotitanate, tetraethyl zirconate, tetra-iso-propyl zirconate tetra-n-propyl zirconate. Mixtures of compounds of formula V may also be used in the preparation of fluorinated siloxanes.

Typically the fluorinated silane is dissolved or dispersed in a dispersing medium (e.g., water and/or organic solvent (e.g., alcohols, ketones, esters, alkanes and/or fluorinated solvents (e.g., hydrofluoroethers and/or perfluorinated carbons)) that is then applied to the particles. The amount of liquid medium used should be sufficient to allow the solution or dispersion to generally evenly wet the particles being treated. Typically, the concentration of the fluorinated silane in the solution/dispersion solvent is the range from about 5% to about 20% by weight, although amounts outside of this range may also be useful. Some formulations containing fluorinated silanes (e.g., of formula I) that may be useful are included in U.S. Pat. No. 6,613,860 (Dams et al.), the disclosure of which is incorporated herein by reference. The particles are typically treated with the fluorinated silane solution/dispersion at temperatures in the range from about 25° C. to about 50° C., although temperatures outside of this range may also be useful. The treatment solution/dispersion can be applied to the particles using techniques known in the art for applying solutions/dispersions to particles (e.g., mixing the solution/dispersion and particles in a vessel (in some embodiments under reduced pressure) or spraying the solutions/dispersions onto the particles). After application of the treatment solution/dispersion to the particles, the liquid medium can be removed using techniques known in the art (e.g., drying the particles in an oven). Typically, about 0.1 to about 5 (in some embodiments, for example, about 0.5 to about 2) percent by weight fluorinated silane is added to the particles, although amounts outside of this range may also be useful.

Hydrolysis of the Y groups (i.e., alkoxy, acyloxy, or halogen) of reactive fluorinated silanes and other fluorinated siloxane precursors typically generates silanol groups, which participate in condensation reactions to form fluorinated siloxanes, for example, according to Scheme I, and/or participate in bonding interactions with silanol groups or other metal hydroxide groups on the surface of particles (including proppants). The bonding interaction may be through a covalent bond (e.g., through a condensation reaction) or through hydrogen bonding. Hydrolysis can occur, for example, in the presence of water optionally in the presence of an acid or base (in some embodiments, acid). The water necessary for hydrolysis made be added to a formulation containing the fluorinated silane that is used to coat the particles (e.g., proppants), may be adsorbed to the surface of the particles, or may be present in the atmosphere to which the fluorinated silane is exposed (e.g., an atmosphere having a relative humidity of at least 10%, 20%, 30%, 40%, or even at least 50%). Water (e.g., brine) may be present in a subterranean geological formation comprising hydrocarbons and may cause hydrolysis of hydrolysable groups on a fluorinated silane or other fluorinated siloxane precursor (and cause condensation to provide a fluorinated siloxane) during the injection of particles into a fracture of the formation.

Scheme I

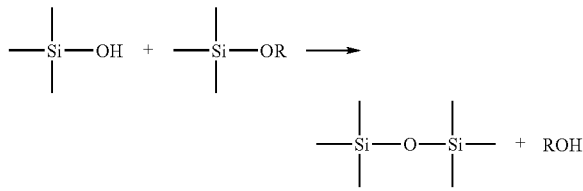

Under neutral pH conditions, the condensation of silanol groups is typically carried out at elevated temperature (e.g., in a range from 40° C. to 200° C. or even 50° C. to 100° C.). Under acidic conditions, the condensation of silanol groups may be carried out at room temperature (e.g., in a range from about 15° C. to about 30° C. or even 20° C. to 25° C.). The rate of the condensation reaction is typically dependent upon temperature and the concentration of fluorinated silane (e.g., in a formulation containing the fluorinated silane).

Techniques for fracturing subterranean geological formation comprising hydrocarbons are known in the art, as are techniques for injecting proppants into the fractured formation to prop open fracture openings. In some methods, a hydraulic fluid is injected into the subterranean geological formation at rates and pressures sufficient to open a fracture therein. The fracturing fluid (usually water with specialty high viscosity fluid additives) when injected at the high pressures exceeds the rock strength and opens a fracture in the rock. Proppant particles described herein can be included in the fracturing fluid.

Optionally, conventional proppant materials can also be used together with the treated particles (including proppants) described herein.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Example 1

A 5% by weight treatment solution was prepared by diluting a 20% by weight aqueous fluoropolymer solution (obtained from 3M Company, St. Paul, Minn. under the trade designation "3M STAIN RESISTANT ADDITIVE SRC-220") to 5% with isopropyl alcohol.

About 100 grams of an intermediate strength ceramic proppant (obtained under the trade designation "CARBOPROP 20/40"; (20/40 mesh) from Carboceramics, Irving, Tex.) were placed in a 500 milliliter (ml) flask. About 20 grams of the treatment solution was added to the proppant containing flask at 25° C. The contents of the flask was heated to about 50° C. via a water bath and mixed for about 30 minutes. After mixing, the liquid medium (i.e., the solvent) was removed by using a rotary evaporator (obtained under the trade designation "ROTAVAPOR" (Model R-124) from Brinkmann Instruments, Inc, Westbury, N.Y.) under reduced pressure (about 50 mm Hg) at about 50° C. The treated proppant was then dried in the oven at about 70° C. for about 3 hours. The weight percent of the active fluoropolymer added to the proppants was about 1% by weight.

Example 2

Example 2 treated proppant was prepared as described for Example 1, except treatment solution was prepared by diluting a 20% by weight aqueous fluoropolymer solution ("3M STAIN RESISTANT ADDITIVE SRC-220") to 5% with water. The weight percent of the active fluoropolymer added to the proppants was about 1% by weight.

Example 3

Example 3 treated proppant was prepared as described for Example 1, except the treatment solution was prepared by diluting a 10% by weight fluorinated disilane solution (obtained from 3M Company under the trade designation "3M EASY CLEAN COATING ECC-4000") to 5% by weight with ethanol. The weight percent of the active fluorinated disilane added to the proppants was about 1% by weight.

Example 4

Example 4 treated proppant was prepared as described for Example 1, except the treatment solution was prepared by diluting a 20% by weight aqueous fluoropolymer solution ("3M STAIN RESISTANT ADDITIVE SRC-220") to 10% with isopropyl alcohol. The weight percent of the active fluoropolymer added to the proppants was about 2% by weight.

Example 5

Example 5 treated proppant was prepared as described for Example 1, except the treatment solution was 5% by weight of 3-(N-Methylperfluorobutanesulfonamidopropyl)trimethoxysilane $C_4F_9SO_2N(CH_3)(CH_2)_3Si(OCH_3)_3$ in ethanol. The synthesis of this material is described as follows: A mixture of about 626 grams (2 mol) of $C_4F_9SO_2N(CH_3)H$, generally made as described in U.S. Pat. No. 6,664,354 (Savu et al.), Example 1, Part A, the disclosure of which is incorporated herein by reference, about 432 grams (2 mol) of a 25% by weight NaOMe in MeOH, and 100 ml of diglyme was stripped on a rotovapor to leave a soft solid.

The resulting solid was transferred to a 3 liter, 3-neck paddle-stirred flask with about 400 ml of diglyme. The contents of the flask was stirred at 50° C. About 400 grams (2 mol) of $Cl(CH_2)_3Si(OCH_3)_3$ was added to the flask in a slow stream. The mixture was heated overnight at about 90° C. Gas Chromatography showed incomplete reaction. The contents of the flask was then heated to about 120° C. for about 10 hours. Gas Chromatography showed the reaction was essentially complete. The resulting slurry was cooled to about 25° C., and the NaCl filtered out. The resulting cake was rinsed with methylene chloride. The mixture was one-plate distilled to yield first diglyme at about 30° C./1 mmHg (133 Pa) and then product at about 100-120° C./0.3 mmHg (40 Pa). About 20 grams of the resulting 5% $C_4F_9SO_2N(CH_3)(CH_2)_3Si(OCH_3)_3$ was used to treat 100 grams of proppant ("CARBOPROP 20/40") as described in Example 1. The weight percent of $C_4F_9SO_2N(CH_3)(CH_2)_3Si(OCH_3)_3$ added to the proppants was about 1% by weight.

Example 6

Example 6 treated proppant was prepared as described for Example 1, except the treatment solution was 10% by weight aqueous fluoropolymer solution. This treatment solution was prepared by adding about 10 grams of water to about 10 grams of a 20% by weight aqueous fluoropolymer solution ("3M STAIN RESISTANT ADDITIVE SRC-220"). The weight percent of the active fluoropolymer added to the proppants was about 2% by weight.

Example 7

Example 7 treated proppant was prepared as described for Example 1, except the treatment solution was 5% by weight $[C_4F_9SO_2N(CH_3)CH_2]_2CHOC(O)NH(CH_2)_3Si(OCH_2CH_3)_3$ in EtOH.

$[C_4F_9SO_2N(CH_3)CH_2]_2CHOH$ was prepared as follows. A three-necked round bottom 1000-ml flask, fitted with a stirrer, heating mantle, condenser, nitrogen inlet, Dean-Stark trap and thermometer was charged with about 313 grams of $C_4F_9SO_2N(CH_3)H$ (1 mole (mol)), generally made as described in U.S. Pat. No. 6,664,354 (Savu et al.), Example 1, Part A, the disclosure of which is incorporated herein by reference, about 100 grams of N,N-dimethylformamide, and about 40 grams of heptane. The mixture was heated to reflux, and then dried by azeotropic distillation. The mixture was cooled to about 30° C. under nitrogen purge, and about 180 grams of sodium methoxide (30% in methanol; 1 mol) was added. The mixture was heated at about 50° C. for about 1 hour, stripping off methanol under vacuum from an aspirator. About 65 grams of 1,3-dichloro-2-propanol (0.5 mol) was added to the flask and the temperature was elevated to about 80° C. and held overnight. The result mixture was washed with deionized water (about 300 ml at about 80° C.) three times, and the remaining organic layer was separated and dried in an oven at about 120° C. for about 1 hour. Vacuum distillation at about 150° C. to about 200° C. at about 0.1 to about 0.5 mm Hg (13 to 67 Pa) resulted in about 275 grams of product.

Next, $[C_4F_9SO_2N(CH_3)CH_2]_2CHOC(O)NH(CH_2)_3Si(OCH_2CH_3)_3$ was prepared as follows. A three-necked round bottom 500 ml flask fitted with a stirrer, heating mantle, condenser, nitrogen inlet, Dean-Stark trap and thermometer was charged with about 204.6 grams of the $[C_4F_9SO_2N(CH_3)CH_2]_2CHOH$ (0.3 mol), and about 250 grams methyl ethyl ketone. The mixture was heated for about 1 hour at about 100° C. and about 50 grams of material was removed using the Dean-Stark trap. The mixture was cooled to about 30° C., and about 74.4 grams of $OCN(CH_2)_3Si(OCH_2CH_3)_3$ (0.3 mol), and three drops of stannous octanoate were added. The resulting mixture was heated at about 75° C. under nitrogen for about 16 hours.

The weight percent of $[C_4F_9SO_2N(CH_3)CH_2]_2CHOC(O)NH(CH_2)_3Si(OCH_2CH_3)_3$ added to the proppants was about 2% by weight.

Example 8

Example 8 treated proppant was prepared as described for Example 1, except the treatment solution was 5% by weight of a copolymer of MeFBSEA/ODMA/A-174/HS(CH$_2$)$_3$Si(OCH$_3$)$_3$ at the molar ratio of (6:1:1:1) in isopropyl alcohol.

3-N-Methylperfluorobutanesulfonamidoethyl acrylate (N-MeFBSEA) was prepared according to the method of U.S. Pat. No. 6,664,354 (Savu), Example 2, Part B, the disclosure of which is incorporated herein by reference.

The of MeFBSEA/ODMA/A-174/HS(CH$_2$)$_3$Si(OCH$_3$)$_3$ was prepared as follows. About 123.3 grams of the N-MeFBSEA, about 16.9 grams of octadecyl methacrylate (ODMA, obtained from Sigma-Aldrich, St Louis, Mo.), 11.8 grams of methylacryloxypropyltrimethoxysilane (obtained from Sigma-Aldrich), about 9.8 grams of (3-mercaptopropyl)trimethoxy silane (obtained from Sigma-Aldrich), about 1 gram of t-butylperoctoate, and about 163 grams of isopropyl alcohol were added to a 1 liter flask equipped with an overhead stirrer, a thermocouple, and a reflux condenser with nitrogen flowing though the opening used for monomer addition. After the additions, the flask was kept under slight positive nitrogen pressure in order to exclude oxygen from the batch. The reactants were heated to about 80° C. Due to an initial exotherm, the batch heated itself to about 90° C. The heating was continued for 5 hours. The percent solid of the polymer was about 50% by weight. The 50% by weight concentrate was diluted with isopropyl alcohol to 10% by weight solution for proppant treatment.

About 10 grams of the treatment solution was used to treat about 100 grams of proppant as described in Example 1. The weight percent of the active fluoropolymer added to the proppants was about 1% by weight.

The contact angles for treated proppant (after drying at about 70° C.) were measured using a goniometer (obtained under the trade designation "KRUSS G120" from Kruss GmbH, Hamburg, Germany). Although not wanting to be bound by theory, it is believed, the measurement of the static, water and hexadecane contact angle provides a prediction of the surface properties of coated proppants. For each example, about 2 grams of coated proppant was placed on a glass slide for measurement. The slide was gently tapped to form a thin layer of proppant on the slide. The average of 3 measurements for each of Examples 1-7 are provided in Table 1, below.

TABLE 1

| Example | Static Water Contact Angle (degree) | Static Hexadecane Contact Angle (degree) |
| --- | --- | --- |
| 1 | 126 | 101 |
| 2 | 123 | 86 |
| 3 | 118 | 80 |
| 4 | 117 | 87 |
| 5 | 120 | 97 |
| 6 | 124 | 100 |
| 7 | 110 | 84 |
| Untreated Proppant | absorbed | absorbed |

The oil and water absorption (i.e., oil and water imbibition) of the examples was also measured. About 10 grams of treated proppant was immersed into about 20 grams of deionized water for about 1 hour. The water was filtered off with filter paper (Qualitative Grade 4); Whatman Filter Paper, Florham Park, N.J. The surface water was carefully removed with paper towel, and the proppant again weighed. The water absorption was then calculated based on the difference in weight before and after immersion in the water. The water absorptions values (an average of 2 measurements) for Examples 1-7 are provided in Table 2, below.

TABLE 2

| Example | Water Absorption (%) | Oil Absorption (%) |
| --- | --- | --- |
| 1 | 0.75 | 1.6 |
| 2 | 0.9 | 2 |
| 3 | 1.3 | 2.6 |
| 4 | 0.55 | 0.8 |
| 5 | 5.8 | 2.4 |
| 6 | 1.1 | 1.4 |
| 7 | 0 | 1 |
| 8 | 1.5 | 2.5 |
| Untreated Proppant | 6.5 | 5 |

The oil absorption for each example was determined as was described above for the water absorption, wherein a tetradecane solution (obtained from Sigma-Aldrich) was used in place of the deionized water. The oil absorptions values (an average of 2 measurements) for Examples 1-8 are provided in Table 2, above.

Comparative Example

The water absorption of a natural (standard Ottawa) sand (obtained from EM Science, Gibbstown, N.J.) was measured as described above for Examples 1-8, and determined to be 19%. There was no contact angle that could be measured because the liquids were absorbed.

Example 9

A standard Ottawa sand (EM Science) was treated with a 10% by weight fluorochemical silane solution as described in Example 6. The weight percent of the active fluoropolymer added to the proppants was about 2% by weight. This treated proppant (sand) had a water absorption value of 1.7%. The water and oil contact angles of the treated proppant were 124 and 108, respectively.

Example 10

The standard Ottawa sand (EM Science) was treated with a fluorochemical silane as described in Example 3. This treated proppant (sand) had a water absorption value of 5%.

Example 11

A white resin coated ceramic proppant (obtained from BJ Services, Houston, Tex. under the trade designation "LITEPROP 175") was treated with a treatment solution as described in Example 4. The weight percent of the active fluoropolymer added to the proppants was about 2%.

Example 12

A white resin coated ceramic proppant ("LITEPROP 175") was treated with a treatment solution as described in Example 6. The weight percent of active fluoropolymer added to the proppants was about 2%.

Example 13

A white resin coated ceramic proppant ("LITEPROP 175") was treated with a treatment solution as described in Example 3. The weight percent of active silane added to the proppants was about 1%.

Example 14

A white resin coated ceramic proppant ("LITEPROP 175") was treated with a treatment solution as described in Example 3, except the treatment solution was prepared by diluting a fluorinated disilane (100% solids; obtained from 3M Company under the trade designation "3M EASY CLEAN COATING ECC-1000") to 5% using a fluorinated fluid (obtained from 3M Company under the trade designation "3M NOVEC ENGINEERED FLUID HFE-7100"), and then adding 1%, by weight, based on the total weight of the diluted solution, hydrochloric acid (37% by weight concentration). The weight percent of active silane added to the proppants was about 1%.

Example 15

A white resin coated ceramic proppant ("LITEPROP 175") was treated with a treatment solution as described in Example 5. The weight percent of active $C_4F_9SO_2N(CH_3)(CH_2)_3Si(OCH_3)_3$ added to the proppants was 1%.

Example 16

A white resin coated ceramic proppant ("LITEPROP 175") was treated with a treatment solution as described in Example 5, except 1% by weight acid (37% by weight concentration) was added to the treatment solution. The weight percent of active $C_4F_9SO_2N(CH_3)(CH_2)_3Si(OCH_3)_3$ added to the proppants was about 1%.

Example 17

Example 17 was prepared as described in Example 14, except that no hydrochloric acid was added to the treatment solution. The weight percent of active silane added to the proppants was about 1%.

Example 18

A white resin coated ceramic proppant ("LITEPROP 175") was treated with a treatment solution as described in Example 7. The weight percent of $[C_4F_9SO_2N(CH_3)CH_2]_2CHOC(O)NH(CH_2)_3Si(OCH_2CH_3)_3$ added the proppants was about 1%.

Example 19

A white resin coated ceramic proppant ("LITEPROP 175") was treated with a treatment solution as described in Example 8. The weight percent of polymeric silane added the proppants was about 1%.

Example 20

A white resin coated ceramic proppant ("LITEPROP 175") was treated with a treatment solution as described in Example 5, except the treatment solution was a 10% solution of fluorinated urethane silane (obtained from 3M Company under the trade designation "PM-490"), and about 20 grams of the treatment solution were added to about 100 grams of proppant.

The contact angles of the treated proppants of the Comparative Example and Examples 11-20 were measured as described above. The results are listed in Table 3, below.

TABLE 3

| Example | Static Water Contact Angle (degree) | Static Hexadecane Contact Angle (degree) |
| --- | --- | --- |
| 11 | 126 | 107 |
| 12 | 120 | 71 |
| 13 | 115 | 94 |
| 14 | 110 | Absorbed |
| 15 | 116 | 115 |
| 16 | 114 | 110 |
| 17 | — | — |
| 18 | 115 | 104 |
| 19 | 115 | Absorbed |
| 20 | 118 | 118 |

The water and oil absorption rate of Examples 11-20 (and the untreated white resin coated ceramic proppant ("LITEPROP 175")) were also determined as described above. These results are listed in Table 4, below.

TABLE 4

| Example | Water Absorption (%) | Oil Absorption (%) |
| --- | --- | --- |
| 11 | 0.5 | 4 |
| 12 | 8 | 10 |
| 13 | 0 | 11 |
| 14 | 5 | 11 |
| 15 | 0 | 5 |
| 16 | 0.5 | 8 |
| 17 | 7 | 9 |
| 18 | 0 | 8 |
| 19 | 6 | 15 |
| 20 | 4 | 10 |
| Untreated ("LITEPROP 175") Proppant | 25 | 20 |

Various modifications and alterations of this invention will become apparent to those skilled in the art without departing from the scope and spirit of this invention, and it should be understood that this invention is not to be unduly limited to the illustrative embodiments set forth herein.

What is claimed is:
1. A particle treated with at least one fluorinated siloxane, the particle being at least 500 micrometers in size, wherein the fluorinated siloxane comprises a condensation product of at least one reactive fluorinated silane selected from the group consisting of:

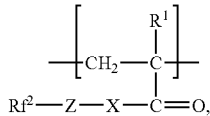

a polymeric fluorinated composition comprising:
at least one divalent unit represented by the formula:

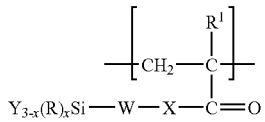

and
at least one of
at least one divalent unit represented by the formula:

$$\begin{array}{c} R^1 \\ | \\ -\!\!\!-\!\!\!\!\left[CH_2-\!\!\!\!\!\!\!\!\underset{|}{C}\right]\!\!\!\!-\!\!\!- \\ Y_{3-x}(R)_xSi-\!\!\!W-\!\!\!X-\!\!\!C\!\!=\!\!O \end{array}$$

or
a chain-terminating group represented by the formula:

—S—W—SiY$_{3-x}$(R)$_x$; and a fluorinated urethane oligomer of at least two repeat units comprising:
at least one end group represented by the formula —O—Z—Rf$^2$, and
at least one end group represented by the formula —X$^1$—W—SiY$_{3-x}$(R)$_x$;
wherein
Rf is a monovalent or multivalent perfluoroalkyl group optionally interrupted by at least one —O—;
Rf$^2$ is a monovalent perfluoroalkyl group optionally interrupted by at least one —O—;
each R is independently selected from the group consisting of alkyl having one to six carbon atoms and aryl;
Q is a divalent or trivalent organic linking group containing from 1 to 4 functional groups selected from the group consisting of ester, amide, sulfonamide, carbonyl, carbonate, urea, and carbamate;
each Y is independently selected from the group consisting of hydroxyl, alkoxy, acyloxy, and halogen;
each R$^1$ is independently selected from the group consisting of hydrogen and alkyl having one to four carbon atoms;
each W is independently selected from the group consisting of alkylene, arylalkylene, and arylene, wherein alkylene is optionally interrupted or substituted by at least one heteroatom;
each X is independently selected from the group consisting of —NH—, —O—, and —S—;
X$^1$ is selected from the group consisting of —N(H)—, —O—, —O—C(O)—NH—, and —O-alkylene-O—C(O)—NH—;
Z is a divalent organic linking group;
x is 0, 1, or 2;
y is 1 or 2; and
z is 1, 2, 3, or 4.

2. The treated particle according to claim 1, wherein the fluorinated siloxane is bonded to the treated particle.

3. The treated particle according to claim 1, wherein the fluorinated siloxane comprises a condensation product of at least one fluorinated urethane oligomer of at least two repeat units comprising:
at least one end group represented by the formula —O—(CH$_2$)$_n$N(R$^4$)S(O)$_2$—Rf$^3$, and at least one end group represented by the formula —NH—(CH$_2$)$_n$—SiY$_3$;

wherein
R$^4$ is alkyl having one to four carbon atoms;
Rf$^3$ is a perfluoroalkyl group having from one to eight carbon atoms;
each Y is independently selected from the group consisting of hydroxyl, alkoxy, acyloxy, and halogen; and
each n is independently an integer from 1 to 4.

4. The treated particle according to claim 1, wherein the particle is made of a material selected from the group consisting of sand, thermoplastic, clay, glass, and alumina.

5. The treated particle according to claim 1, wherein the treated particle has a plurality of pores, and wherein the treated particle has at least one of water or oil imbibition up to 95% as compared to a comparable, untreated particle.

6. A plurality of particles, wherein at least a portion are the treated particles according to claim 1.

7. A particle treated with at least one fluorinated siloxane, wherein the particle is a ceramic particle having a plurality of pores or an engineered proppant, wherein the fluorinated siloxane comprises a condensation product of at least one reactive fluorinated silane selected from the group consisting of:

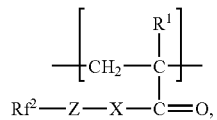

a polymeric fluorinated composition comprising:
at least one divalent unit represented by the formula:

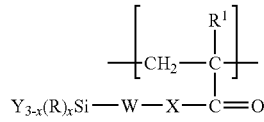

and
at least one of
at least one divalent unit represented by the formula:

$$\begin{array}{c} R^1 \\ | \\ -\!\!\!-\!\!\!\!\left[CH_2-\!\!\!\!\!\!\!\!\underset{|}{C}\right]\!\!\!\!-\!\!\!- \\ Y_{3-x}(R)_xSi-\!\!\!W-\!\!\!X-\!\!\!C\!\!=\!\!O \end{array}$$

or
a chain-terminating group represented by the formula:

—S—W—SiY$_{3-x}$(R)$_x$; and a fluorinated urethane oligomer of at least two repeat units comprising:
at least one end group represented by the formula —O—Z—Rf$^2$, and
at least one end group represented by the formula —X$^1$—W—SiY$_{3-x}$(R)$_x$;

wherein
- Rf is a monovalent or multivalent perfluoroalkyl group optionally interrupted by at least one —O—;
- $Rf^2$ is a monovalent perfluoroalkyl group optionally interrupted by at least one —O—;
- each R is independently selected from the group consisting of alkyl having one to six carbon atoms and aryl;
- Q is a divalent or trivalent organic linking-group containing from 1 to 4 functional groups selected from the group consisting of ester, amide, sulfonamide, carbonyl, carbonate, urea, and carbamate;
- each Y is independently selected from the group consisting of hydroxyl, alkoxy, acyloxy, and halogen;
- each $R^1$ is independently selected from the group consisting of hydrogen and alkyl having one to four carbon atoms;
- each W is independently selected from the group consisting of alkylene, arylalkylene, and arylene, wherein alkylene is optionally interrupted or substituted by at least one heteroatom;
- each X is independently selected from the group consisting of —NH—, —O—, and —S—;
- $X^1$ is selected from the group consisting of —N(H)—, —S—, —O—, —O—C(O)—NH—, and —O-alkylene-O—C(O)—NH—;
- Z is a divalent organic linking group;
- x is 0, 1, or 2;
- y is 1 or 2; and
- z is 1, 2, 3, or 4.

8. The treated particle according to claim 7, wherein the treated particle is the ceramic particle, and wherein the ceramic particle has a density of at least 2 g/cm³.

9. The treated particle according to claim 7, wherein the fluorinated siloxane is bonded to the treated particle.

10. The treated particle according to claim 7, wherein the fluorinated siloxane comprises a condensation product of at least one fluorinated urethane oligomer of at least two repeat units comprising:
at least one end group represented by the formula

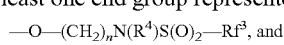

and
at least one end group represented by the formula

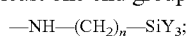

wherein
- $R^4$ is alkyl having one to four carbon atoms;
- $Rf^3$ is a perfluoroalkyl group having from one to eight carbon atoms;
- each Y is independently selected from the group consisting of hydroxyl, alkoxy, acyloxy, and halogen; and
- each n is independently an integer from 1 to 4.

11. The treated particle according to claim 7, wherein the particle is made of a material selected from the group consisting of sand, clay, glass, and alumina.

12. The treated particle according to claim 7, wherein the treated particle has at least one of water or oil imbibition up to 95% as compared to a comparable, untreated particle.

13. A plurality of particles, wherein at least a portion are the treated particles according to claim 7.

14. The treated particle according to claim 7, wherein the treated particle is the engineered proppant, and wherein the engineered proppant is made of a material selected from the group consisting of sand, thermoplastic, clay, glass, and alumina.

15. A method of fracturing a subterranean geological formation comprising hydrocarbons, the method comprising:
injecting a hydraulic fluid into a subterranean geological formation comprising hydrocarbons at a rate and pressure sufficient to open a fracture therein; and
injecting into the fracture a fluid comprising a plurality of particles treated with at least one fluorinated siloxane, wherein the fluorinated siloxane comprises a condensation product of at least one reactive fluorinated silane selected from the group consisting of:

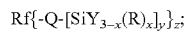

a polymeric fluorinated composition comprising:
at least one divalent unit represented by the formula:

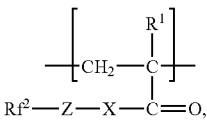

and
at least one of
at least one divalent unit represented by the formula:

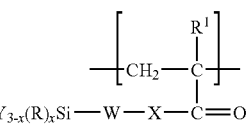

or
a chain-terminating group represented by the formula:

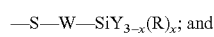

a fluorinated urethane oligomer of at least two repeat units comprising:
at least one end group represented by the formula —O—Z—$Rf^2$, and
at least one end group represented by the formula —$X^1$—W—$SiY_{3-x}(R)_x$;
wherein
- Rf is a monovalent or multivalent perfluoroalkyl group optionally interrupted by at least one —O—;
- $Rf^2$ is a monovalent perfluoroalkyl group optionally interrupted by at least one —O—;
- each R is independently selected from the group consisting of alkyl having one to six carbon atoms and aryl;
- Q is a divalent or trivalent organic linking group containing from 1 to 4 functional groups selected from the group consisting of ester, amide, sulfonamide, carbonyl, carbonate, urea, and carbamate;
- each Y is independently selected from the group consisting of hydroxyl, alkoxy, acyloxy, and halogen;
- each $R^1$ is independently selected from the group consisting of hydrogen and alkyl having one to four carbon atoms;
- each W is independently selected from the group consisting of alkylene, arylalkylene, and arylene, wherein alkylene is optionally interrupted or substituted by at least one heteroatom;
- each X is independently selected from the group consisting of —NH—, —O—, and —S—;
- $X^1$ is selected from the group consisting of —N(H)—, —S—, —O—, —O—C(O)—NH—, and —O-alkylene-O—C(O)—NH—;
- Z is a divalent organic linking group;
- x is 0, 1, or 2;
- y is 1 or 2; and
- z is 1, 2, 3, or 4.

16. The method according to claim 15, wherein the particles are made of a material selected from the group consisting of sand, thermoplastic, clay, glass, and alumina.

17. The method according to claim 15, wherein the particles are engineered proppants.

18. The method according to claim 15, wherein the particles are at least 500 micrometers in size.

19. The method according to claim 15, wherein the fluorinated siloxane comprises a condensation product of at least one fluorinated urethane oligomer of at least two repeat units comprising:

at least one end group represented by the formula

—O—(CH$_2$)$_n$N(R$^4$)S(O)$_2$—Rf$^3$, and at least one end group represented by the formula —NH—(CH$_2$)$_n$—Si[Y$_3$];

wherein

R$^4$ is alkyl having one to four carbon atoms;

Rf$^3$ is a perfluoroalkyl group having from one to eight carbon atoms;

each Y is independently selected from the group consisting of hydroxyl, alkoxy, acyloxy, and halogen; and each n is independently an integer from 1 to 4.

20. The method according to claim 15, wherein the fluorinated siloxane is bonded to the particles.

21. The method according to claim 15, wherein the particles are treated with at least one precursor of the fluorinated siloxane prior to injection into the fracture.

22. The method according to claim 15, wherein the particles are treated with at least one precursor of the fluorinated siloxane during injection into the fracture.

23. The method according to claim 15, wherein the fracture has a conductivity improved by the presence of the fluorinated siloxane.

\* \* \* \* \*